US009406283B2

(12) United States Patent
Kubota

(10) Patent No.: US 9,406,283 B2
(45) Date of Patent: Aug. 2, 2016

(54) DISPLAY CONTROL DEVICE, DISPLAY CONTROL METHOD, AND CONTROL SYSTEM

(75) Inventor: Takashi Kubota, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 142 days.

(21) Appl. No.: 13/637,115

(22) PCT Filed: Dec. 21, 2010

(86) PCT No.: PCT/JP2010/073036

§ 371 (c)(1), (2), (4) Date: Sep. 25, 2012

(87) PCT Pub. No.: WO2012/008065

PCT Pub. Date: Jan. 19, 2012

(65) Prior Publication Data

US 2013/0009871 A1 Jan. 10, 2013

(30) Foreign Application Priority Data

Jul. 15, 2010 (JP) ................................ 2010-160911

(51) Int. Cl.
*G06F 3/01* (2006.01)
*G09G 5/393* (2006.01)

(52) U.S. Cl.
CPC .................................... *G09G 5/393* (2013.01)

(58) Field of Classification Search
CPC ........................................................ G06F 3/01
USPC ........................................... 345/157; 715/856
See application file for complete search history.

(56) References Cited

U.S. PATENT DOCUMENTS 8,666,043 B2 * 3/2014 Ray ............................ 379/93.23
2001/0004254 A1 6/2001 Okahara et al.

(Continued)

FOREIGN PATENT DOCUMENTS

JP 7-244574 9/1995
JP 10-340398 12/1998

(Continued)

OTHER PUBLICATIONS

International Search Report issued Apr. 5, 2011 in corresponding International Application No. PCT/JP2010/073036.

(Continued)

*Primary Examiner* — Amare Mengistu
*Assistant Examiner* — Shawna Stepp Jones
(74) *Attorney, Agent, or Firm* — Wenderoth, Lind & Ponack, L.L.P.

(57) ABSTRACT

A control system is provided with a plurality of input operation devices that send drawing request information for updating display contents at a shared display device, a display control device that is connected to the input operation devices via a communication line, that stores the drawing request information sent from the input operation devices in a buffer, and that updates the display contents in the shared display device on the basis of the drawing request information stored in the buffer. Then, the display control device controls the shared display device so that the display contents based on the drawing request information stored in the buffer are displayed by being updated in order of priority level, which is predetermined for each type of the drawing request information.

8 Claims, 5 Drawing Sheets

(56) References Cited

U.S. PATENT DOCUMENTS

| | | | | |
|---|---|---|---|---|
| 2002/0059308 | A1* | 5/2002 | Kawashima et al. ......... | 707/200 |
| 2008/0320241 | A1* | 12/2008 | Dees et al. .................... | 711/151 |
| 2011/0131327 | A1* | 6/2011 | Bair et al. ..................... | 709/226 |

FOREIGN PATENT DOCUMENTS

| | | |
|---|---|---|
| JP | 2000-57094 | 2/2000 |
| JP | 2000-108588 | 4/2000 |
| JP | 2000-181846 | 6/2000 |
| JP | 2001-306475 | 11/2001 |
| JP | 2004-21595 | 1/2004 |
| JP | 2008-129954 | 6/2008 |
| JP | 2011-123759 | 6/2011 |

OTHER PUBLICATIONS

Written Opinion of the International Searching Authority issued Apr. 5, 2011 in corresponding International Application No. PCT/JP2010/073036.

Decision to Grant a Patent issued Jan. 7, 2014 in corresponding Japanese Application No. 2010-160911 (with English translation).

* cited by examiner

DISPLAY CONTROL DEVICE, DISPLAY CONTROL METHOD, AND CONTROL SYSTEM

BACKGROUND OF THE INVENTION

1. Technical Field

The present invention relates to a display control device, a display control method, and a control system.

2. Description of Related Art

In the related art, a display system, such as the one described in Patent Literature 1, in which a shared display server (display control device) that controls the display on a shared display device and a plurality of participant terminals (input operation devices) are connected via a communication line, thus allowing display operations performed at the individual participant terminals to be reflected on the display at the shared display server has been disclosed. However, with the display system described in Patent Literature 1, for each shared display server, only one terminal is granted the right to operate cursor, etc. displayed on the shared display server.

On the other hand, known processing methods for sharing a single display control device among a plurality of input operation devices include, for example, time-sharing processing, serial processing, and so on.

Time-sharing processing is a processing method in which a display control device allocates an operable period to each of the input operation devices, thereby sequentially executing processing for the individual input operation devices.

Serial processing is a method in which a display control device successively processes the contents of individual operations performed at the input operation devices, and display processing, etc. is performed in order on the basis of instructions received from the individual operation devices by updating display content indicated by drawing request information every time the drawing request information is received from the individual input operation devices.

CITATION LIST

Patent Literature

{PTL 1} Japanese Unexamined Patent Application, Publication No. 2004-21595

SUMMARY OF THE INVENTION

Technical Problem

However, with the time-sharing processing described above, because the processing time allocated to the individual input operation devices is determined in accordance with the number of input operation devices, there is a problem in that the time allocated to the individual input operation devices decreases when the number of the input operation devices is increased, which impairs the operational performance.

As described above, with the serial processing, because operation events received from the individual input operation devices are analyzed at the display control device to successively execute processing for the individual input operation devices, there is a problem in that a processing unit (CPU: Central Processing Unit) of the display control device is subjected to a large processing load. In addition, if operation events are simultaneously sent from the plurality of input operation devices, because the subsequent processing is not executed until the preceding processing is completed, real-time responsiveness is lost at the input operation device that has sent the subsequent operation event, which causes a user to experience the poor operational performance.

The present invention has been conceived in light of the above-described circumstances, and an object thereof is to provide a display control device, a display control method, and a control system that make it possible to maintain real-time responsiveness in updating display contents on a shared display device without impairing the operational performance for users, even if a large amount of drawing request information is output from a plurality of input operation devices.

Solution to Problem

In order to solve the above-described problems, a display control device of the present invention employs the following solutions.

Specifically, a display control device according to a first aspect of the present invention is a display control device that is connected to a plurality of input operation devices via a communication line and that updates display contents on a shared display device on the basis of drawing request information sent from the input operation devices, the display control device including a storage unit that stores multiple pieces of the drawing request information sent from the input operation devices; and a control unit that controls the shared display device so that the display contents based on the drawing request information stored in the storage unit are displayed by being updated in order of priority level, which is predetermined for each type of the drawing request information.

With the first aspect of the present invention, the display control device is connected to the plurality of input operation devices via the communication line and updates the display contents at the shared display device on the basis of the drawing request information sent from the input operation devices. Then the display control device displays the display contents based on the drawing request information been sent from the input operation devices and stored in the storage unit, by updating them in order of priority level, which is predetermined for each type of the drawing request information.

The display control device is connected to the plurality of input operation devices via the communication line. Because of this, the drawing request information is sometimes sent to the display control device in a large amount per unit time. In such a case, it may become impossible to maintain real-time responsiveness in updating the display contents at the shared display device. However, because the display contents based on the drawing request information stored in the storage unit are displayed by being updated in the order of priority level, which is predetermined for each type of drawing request information, by increasing the priority level of the drawing request information indicating display content of importance for a user, as with the present invention, it is possible to maintain real-time responsiveness in updating the display contents on the shared display device without impairing the operational performance for users, even if a large amount of drawing request information is output from the plurality of input operation devices.

With the display control device according to the first aspect of the present invention, in the case in which real-time responsiveness would be lost in updating the display contents in the shared display device if the display contents are updated based on the multiple pieces of the drawing request information stored in the storage unit, the control unit may control the shared display device so that the display contents based on the drawing request information stored in the storage unit are displayed by being updated in the order of priority level, which is predetermined for each type of the drawing request information.

With the first aspect of the present invention, instead of constantly controlling the shared display device so as to display the drawing request information stored in the storage unit, updated in the order of the priority level, the control unit performs this control only when real-time responsiveness will be lost in updating display contents at a shared display device if the display contents based on the multiple pieces of the drawing request information stored in the storage unit are updated. By doing so, the present invention can reduce the processing load on the display control device.

The display control device according to the first aspect of the present invention may be provided with a sorting unit that sorts the multiple pieces of the drawing request information stored in the storage unit in the order of priority level, which is predetermined for each type of the drawing request information, wherein the control unit may read out the multiple pieces of the drawing request information that have been sorted by the sorting unit and stored in the storage unit, in the sorted order, and may control the shared display device so as to display the display contents based on the read-out drawing request information.

With the first aspect of the present invention, the multiple pieces of drawing request information stored in the storage unit are sorted by the sorting unit into the order of priority level, which is predetermined for each type of drawing request information. Then, the control unit reads out the multiple pieces of drawing request information sorted and stored in the storage unit, in the sorted order, and controls the shared display device so that the display contents based on the read-out drawing request information are displayed.

By doing so, with the first aspect of the present invention, it is possible to maintain real-time responsiveness in updating the display contents on the shared display device, with a simple configuration and without impairing the operational performance for users, even if a large amount of drawing request information is output from the plurality of input operation devices. As an example of a storage unit according to the first aspect of the present invention, a FIFO (First In First Out) buffer is employed.

In the display control device according to the first aspect of the present invention, a predetermined type of the drawing request information stored in the storage unit may be deleted from the storage unit, excluding the most recent drawing request information.

With the first aspect of the present invention, because the predetermined type of drawing request information stored in the storage unit is deleted from the storage unit, excluding the most recent drawing request information, the processing load on the display control device can be reduced, and it is possible to better maintain real-time responsiveness in updating the display contents on the shared display device without impairing the operational performance for the users.

With the display control device according to the first aspect of the present invention, the drawing request information may include cursor movement information that indicates a cursor destination displayed on the shared display device, wherein the cursor movement information may specify the cursor destination by means of an absolute position with reference to a predetermined position on a screen indicated by the shared display device.

With the first aspect of the present invention, because the cursor movement information included in the drawing request information specifies the cursor destination by means of an absolute position with reference to the predetermined position on the screen indicated by the shared display device, the display control device does not need to compute the cursor destination, which reduces the processing load on the display control device. In addition, the cursor movement information can be designated as the drawing request information to be deleted from the storage unit.

With the display control device according to the first aspect of the present invention, the display control device may be switched either to a first mode, in which first cursor movement information that specifies the cursor destination by means of absolute position with reference to a predetermined position on the screen of the shared display device, is used as the cursor movement information, or to a second mode, in which second cursor movement information that specifies a next cursor destination at the shared display device on the basis of an amount of cursor movement per unit time at the input operation devices with reference to a previous cursor destination, is used as the cursor movement information.

With the first aspect of the present invention, when the processing load on the display control device needs to be reduced, the first mode is employed, which uses the first cursor movement information that specifies the cursor destination by means of the absolute position with reference to the predetermined position on the screen indicated by the shared display device. On the other hand, when the cursor displayed in the shared display device needs to be more finely moved, the second mode is employed, which uses the second cursor movement information that specifies the next cursor destination at the shared display device on the basis of the amount of cursor movement per unit time in the input operation devices with reference to the previous cursor destination serve.

The cursor movements displayed on monitor devices provided in the input operation devices are reflected in the display at the shared display device.

Because of this, in the case in which the resolution of the monitor device described above is lower than that of the shared display device, in the first mode, the first cursor movement information in which absolute values for the cursor destination in the monitor devices are corrected on the basis of the resolution difference with respect to the shared display device is sent from the input operation devices to the display control device. Accordingly, in the first mode, because the display control device does not need to compute the cursor destination, the processing load on the display control device can be reduced; however, the cursor cannot be finely moved in accordance with the resolution of the shared display device.

On the other hand, in the second mode, because the second cursor movement information indicates the amount of change in relative positions with respect to the previous cursor destination on the screens of the monitor device in the input operation devices, the display control device needs to determine the amount of cursor movement in the shared display device by computing the amount of cursor movement per unit time on the monitor devices described above on the basis of the second cursor movement information. Because of this, in the second mode, the processing load on the display control device is increased. However, in the second mode, because the amount of cursor movement can also be made smaller in the shared display device by making the amount of relative cursor movement per unit time smaller on the screens in the monitor devices described above, the cursor can be moved at the resolution of the shared display device.

In order to solve the above-described problems, a display control method of the present invention employs the following solutions.

Specifically, a display control method according to a second aspect of the present invention is a display control method, in which a plurality of input operation devices are connected via a communication line and display contents in a shared display device are updated on the basis of drawing request information sent from the input operation devices, the display control method including controlling the shared display device so that the display contents based on the drawing request information sent from the input operation devices and stored in a storage unit are displayed by being updated in order of priority level, which is predetermined for each type of the drawing request information.

In order to solve the above-described problems, a control system of the present invention employs the following solutions.

Specifically, a control system according to a third aspect of the present invention is a control system including a plurality of input operation devices that send drawing request information for updating display contents at a shared display device; a display control device that is connected to the input operation devices via a communication line, that stores the drawing request information sent from the input operation devices in a storage unit, and that updates the display contents at the shared display device on the basis of the drawing request information stored in the storage unit, wherein the display control device controls the shared display device so that the display contents based on the drawing request information stored in the storage unit are displayed by being updated in order of priority level, which is predetermined for each type of the drawing request information.

Advantageous Effects of Invention

The present invention affords an excellent advantage in that it is possible to maintain real-time responsiveness in updating display contents on a shared display device without impairing the operational performance for users, even if a large amount of drawing request information is output from a plurality of input operation devices.

DETAILED DESCRIPTION OF THE INVENTION

Embodiments of a display control device, a display control method, and a control system according to the present invention will be described below with reference to the drawings.

First Embodiment

An embodiment of the control system according to the present invention will be described below with reference to the drawings.

Figure 1:
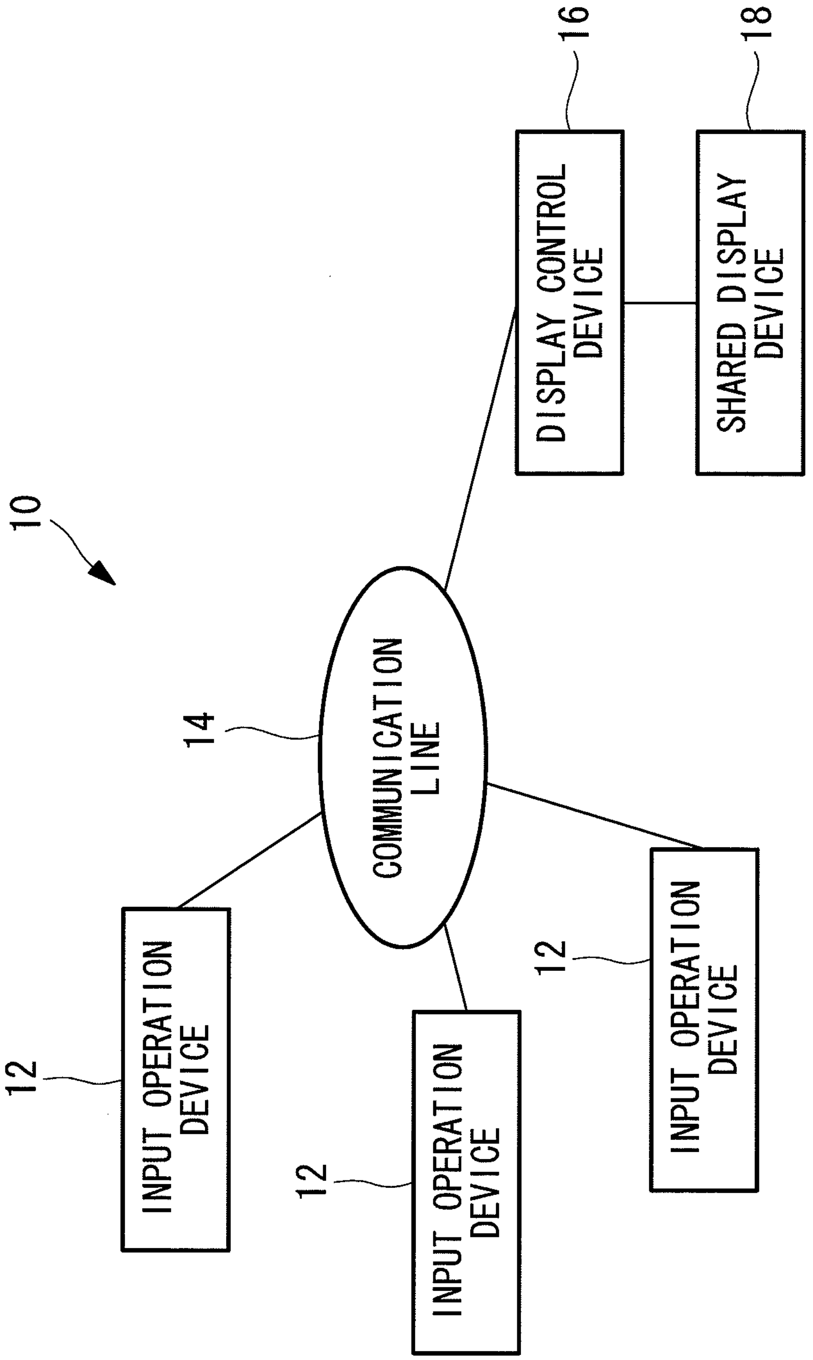
FIG. 1 is a diagram showing the overall configuration of a control system according to a first embodiment of the present invention.

FIG. 1 is a block diagram showing, in outline, the configuration of a control system 10 according to a first embodiment.

As shown in FIG. 1, the control system 10 according to the first embodiment is provided with, for example, a plurality of input operation devices 12, which are information processing terminals, a display control device 16 that is connected to the plurality of input operation devices 12 via a communication line 14, and a shared display device 18 that displays an image on the basis of an image signal output from the display control device 16.

The input operation devices 12 are operation terminals with which individual operators manipulate a cursor and perform operations in windows, which are displayed on a large-screen display at the shared display device 18, and the number provided is, for example, the same as the number of operators. Then, the input operation devices 12 send drawing request information, which indicates contents to be displayed on the shared display device 18, to the display control device 16 via the communication line 14.

The above-described drawing request information includes, for example, cursor movement information, which indicates a cursor destination to be displayed on the shared display device 18, image drawing information for drawing images (diagrams such as line, circle, rectangle, and so forth, as well as image data) generated at the input operation devices 12 on the shared display device 18, click information for executing an application by clicking a button or the like over which the cursor is placed on the shared display device 18, emergency-message display information, created at the input operation devices 12, for causing an emergency message to be displayed on the shared display device 18, and so on.

The communication line 14 is a wide-area communication line provided by electrical services companies, an internal communication network, such as a LAN (Local Area Network), and so forth, and they may be wired or wireless.

The display control device 16 controls the shared display device 18 so that the display contents thereof are updated on the basis of the operation information input from the individual input operation devices 12.

The shared display device 18 is a display device having a liquid-crystal screen, a plasma screen, or the like, and may be a single-screen display device or a display device in which a single large screen is formed by combining a plurality of display devices.

Figure 2:
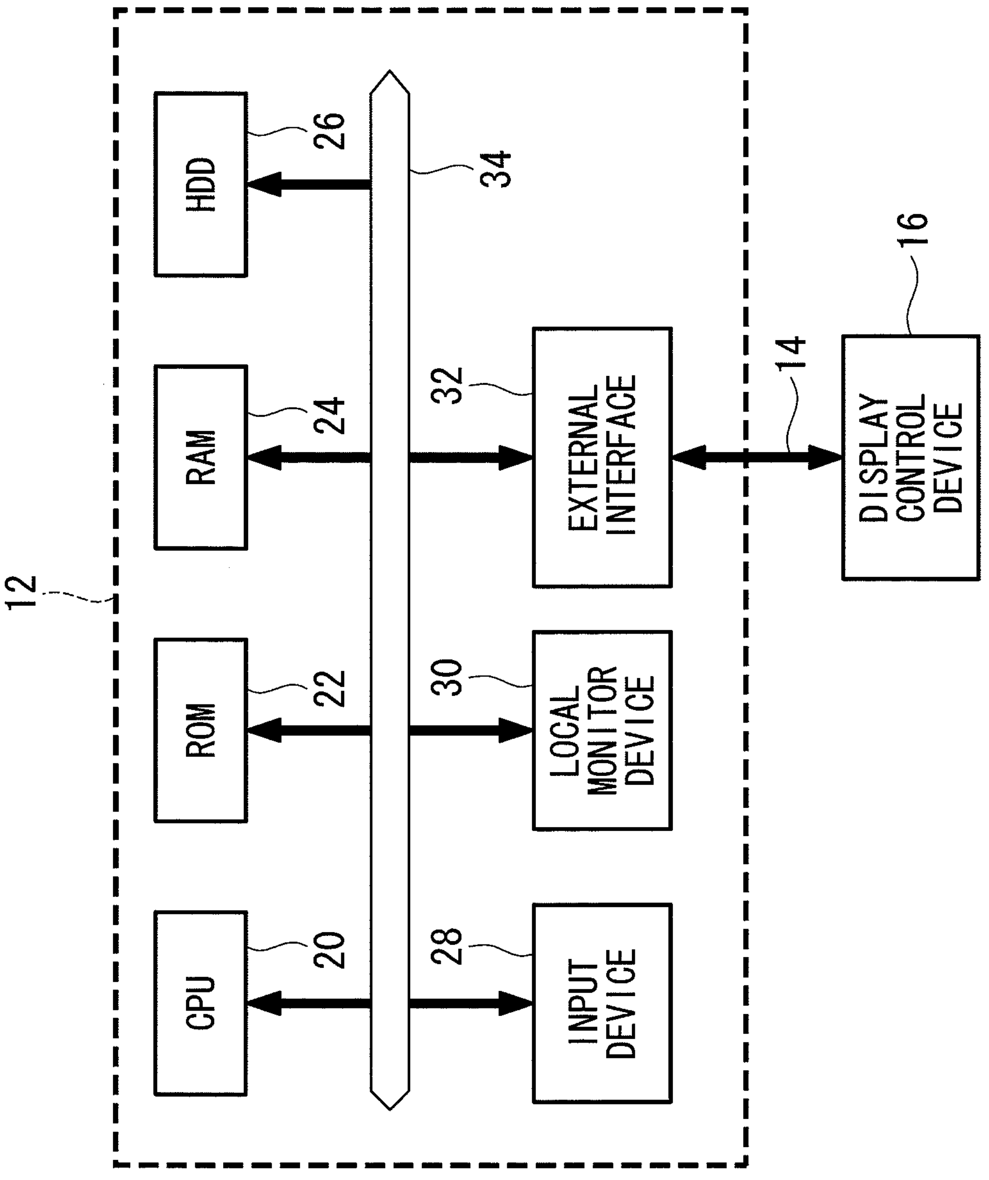
FIG. 2 is a block diagram showing the electrical configuration of an input operation device according to the first embodiment of the present invention.

FIG. 2 shows the electrical configuration of the input operation devices 12.

The input operation devices 12 are provided with a CPU 20 that governs the overall operation of the input operation devices 12, a ROM (Read Only Memory) 22 in which various programs, various parameters, and so forth are stored in advance, a RAM (Random Access Memory) 24 that serves as a work area or the like when the CPU 20 executes various programs, and an HDD (Hard Disk Drive) 26 that serves as storage means (storage unit) for storing various programs and various information.

Furthermore, the input operation devices 12 are provided with an input device 28 that is formed of, for example, a keyboard, a mouse, and so forth, and receives inputs for various operations, a local monitor device 30 for displaying various images, and an external interface 32 that is connected with the display control device 16 via the communication line 14 and that sends and receives various information to and from the display control device 16.

The CPU 20, the ROM 22, the RAM 24, the HDD 26, the input device 28, the local monitor device 30, and the external interface 32 are electrically connected with each other via a system bus 34. Therefore, it is possible for the CPU 20 to individually access the ROM 22, the RAM 24, and the HDD 26, to ascertain the operating states of the input device 28, to display various images on the local monitor device 30, to send and receive various information to and from the display control device 16 via the external interface 32, and so on.

Individual screen resolutions of the local monitor device 30 and the shared display device 18 may be the same or may be different. The local monitor device 30 displays the same image as an image displayed at the shared display device 18, and the local monitor device 30 displays images based on the information input by means of the input device 28 and a cursor reflecting the movements thereof caused by means of the input device 28.

In addition, the information, cursor movement, and so forth input by means of the input device 28 are sent to the display control device 16 as drawing request information via the external interface 32. Specifically, the operator who operates the input operation device 12 displays images, cursor movements, and so forth that they want to display on the shared display device 18 on the local monitor devices 30, and the input operation device 12 sends drawing request information in accordance with the images, cursor movements, and so forth to the display control device 16 so that the images, cursor movements, and so forth displayed on the local monitor device 30 is reflected at the shared display device 18.

In the first embodiment, there is a set priority level, which is predetermined for each type of drawing request information. Table 1 shows examples of the priority levels corresponding to the types of drawing request information, where drawing request information whose priority level is shown with a smaller value has a higher priority level.

The priority levels shown in Table 1 are set so as to be higher for drawing request information indicating display content of greater importance for users. For example, the emergency-message display information is set to the highest priority level because it is drawing request information for displaying an emergency message on the shared display device 18. On the other hand, the click information is set to a lower priority level than the cursor movement information because it is information for clicking a button or the like over which the cursor is placed, where it is assumed that the cursor has been moved to the position of a button or the like according to the cursor movement information.

The input operation device 12 according to the first embodiment adds priority-level information, which indicates the priority level described above, to each piece of drawing request information and sends it to the display control device 16.

TABLE 1

| TYPE OF DRAWING REQUEST INFORMATION | PRIORITY LEVEL |
|---|---|
| EMERGENCY-MESSAGE DISPLAY INFORMATION | 1 |
| IMAGE DRAWING INFORMATION | 2 |
| CURSOR MOVEMENT INFORMATION | 3 |
| CLICK INFORMATION | 4 |

The input operation device 12 according to the first embodiment specifies the absolute position of a cursor destination on the screen of the local monitor device 30 and sends the absolute positions to the display control device 16 as cursor movement information so that the cursor destination can be specified by means of the absolute position on the screen of the shared display device 18.

For the cursor absolute position, for example, predetermined positions on the screens of the shared display device 18 and the local monitor device 30 serve as reference positions. In this embodiment, the lower left portion of the screen with the coordinate origin at (x, y)=(0, 0) is used as an example of the reference position. In this case, the horizontal direction from the lower left portion is defined as the x-axis and the vertical direction therefrom is defined as the y-axis, and the x-coordinate value increases rightward with reference to the lower left portion of the screen and the y-coordinate value increases upward with reference to the lower left portion of the screen.

In addition, in the case in which resolutions differ between the shared display device 18 and the local monitor device 30, because the CPU 20 corrects the cursor movement information on the basis of the resolution difference between the shared display device 18 and the local monitor device 30 and sends it to the display control device 16, the display control device 16 does not need to compute the cursor destination, which reduces the processing load on the display control device 16.

For example, when the resolution of the shared display device 18 is 4096 pixels by 768 pixels, and the resolution of the local monitor device 30 is 1024 pixels by 768 pixels, the CPU 20 sets the cursor destination specified on the screen of the local monitor device 30 to be four times greater in the x-axis direction and sends this information to the display control device 16 as the cursor movement information.

Figure 3:
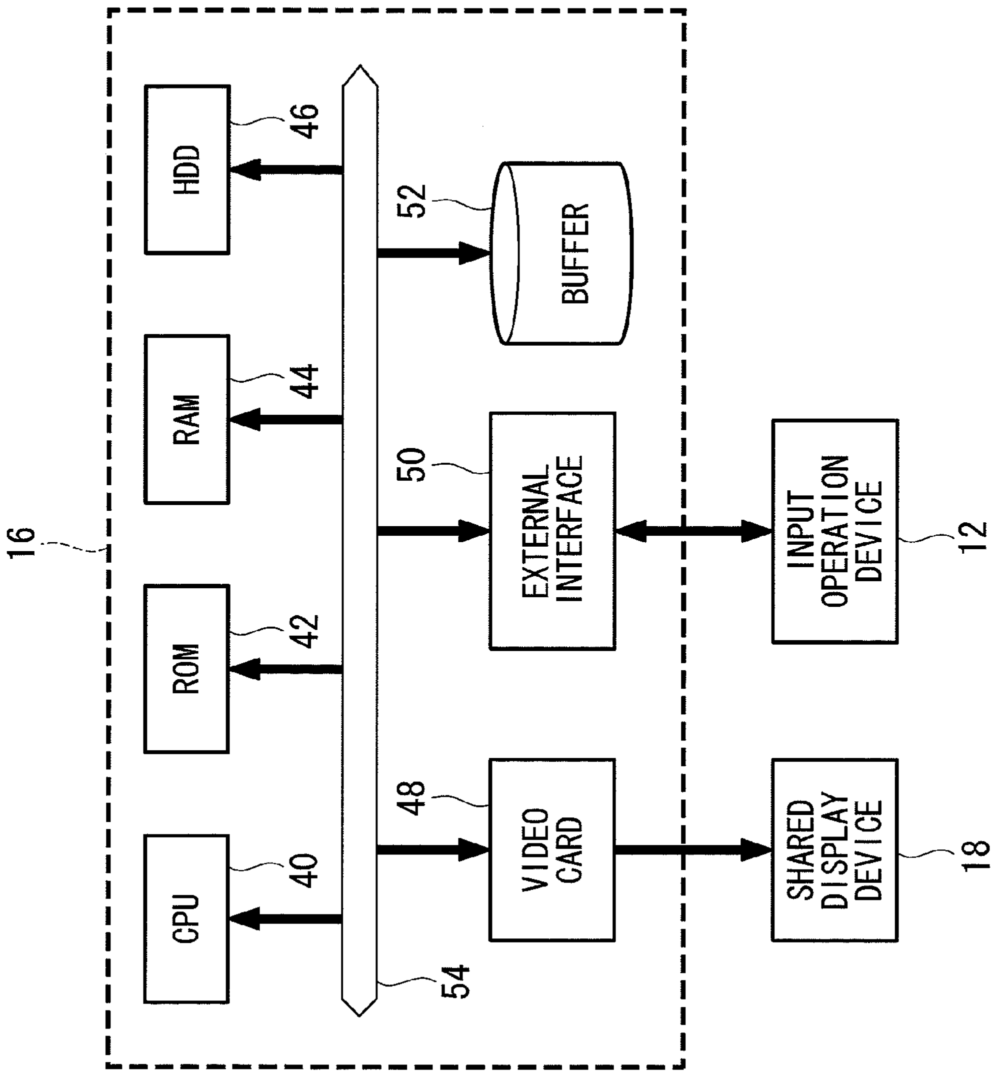
FIG. 3 is a block diagram showing the electrical configuration of a display control device according to the first embodiment of the present invention.

FIG. 3 shows the electrical configuration of the display control device 16.

The display control device 16 is provided with a CPU 30 that governs the overall operation of the display control device 16, a ROM 42 in which various programs, various parameters, and so forth are stored in advance, a RAM 44 that serves as a work area or the like when the CPU 40 executes various programs, and an HDD 46 that serves as storage means (storage unit) for storing various programs and various information.

Furthermore, the display control device 16 is provided with a video card 48 that is connected to the shared display device 18 and that outputs to the shared display device 18 an image signal that indicates an image to be displayed on the shared display device 18, an external interface 50 that is connected to the individual input operation devices 12 via the communication line 14 and that sends and receives various information to and from the input operation devices 12, and a buffer 52 that stores the drawing request information sent from the input operation devices 12.

The CPU 40, the ROM 42, the RAM 44, the HDD 46, the video card 48, the external interfaces 50, and the buffer 52 are electrically connected with each other via a system bus 54. Therefore, it is possible for the CPU 40 to individually access the ROM 42, the RAM 44, the HDD 46, and the buffer 52, to give instructions to the video card 48 with regard to image signal output, to send and receive various information to and from the input operation devices 12 via the external interface 50, and so on.

The buffer 52 according to the first embodiment is a FIFO buffer and stores the drawing request information sent from the individual input operation devices 12 in the order in which the drawing request information is sent thereto.

Then, the display control device 16 according to the first embodiment controls the shared display device 18 so that display contents based on the multiple pieces of drawing request information stored in the buffer 52 are displayed by being updated in the order of the priority level, which is predetermined for each type of drawing request information.

Then, in order to control the shared display device 18 in this way, the display control device 16 performs sorting processing in which the multiple pieces of drawing request information stored in the buffer 52 are sorted in the order of the priority level, which is predetermined for each type of drawing request information, reads out the multiple pieces of drawing request information that have been sorted by the sorting processing and stored in the buffer 52, in the sorted order, and controls the shared display device 18 so that the display contents are displayed on the basis of the read-out drawing request information.

Next, the operation of the display control device 16 according to the first embodiment will be described.

Figure 4:
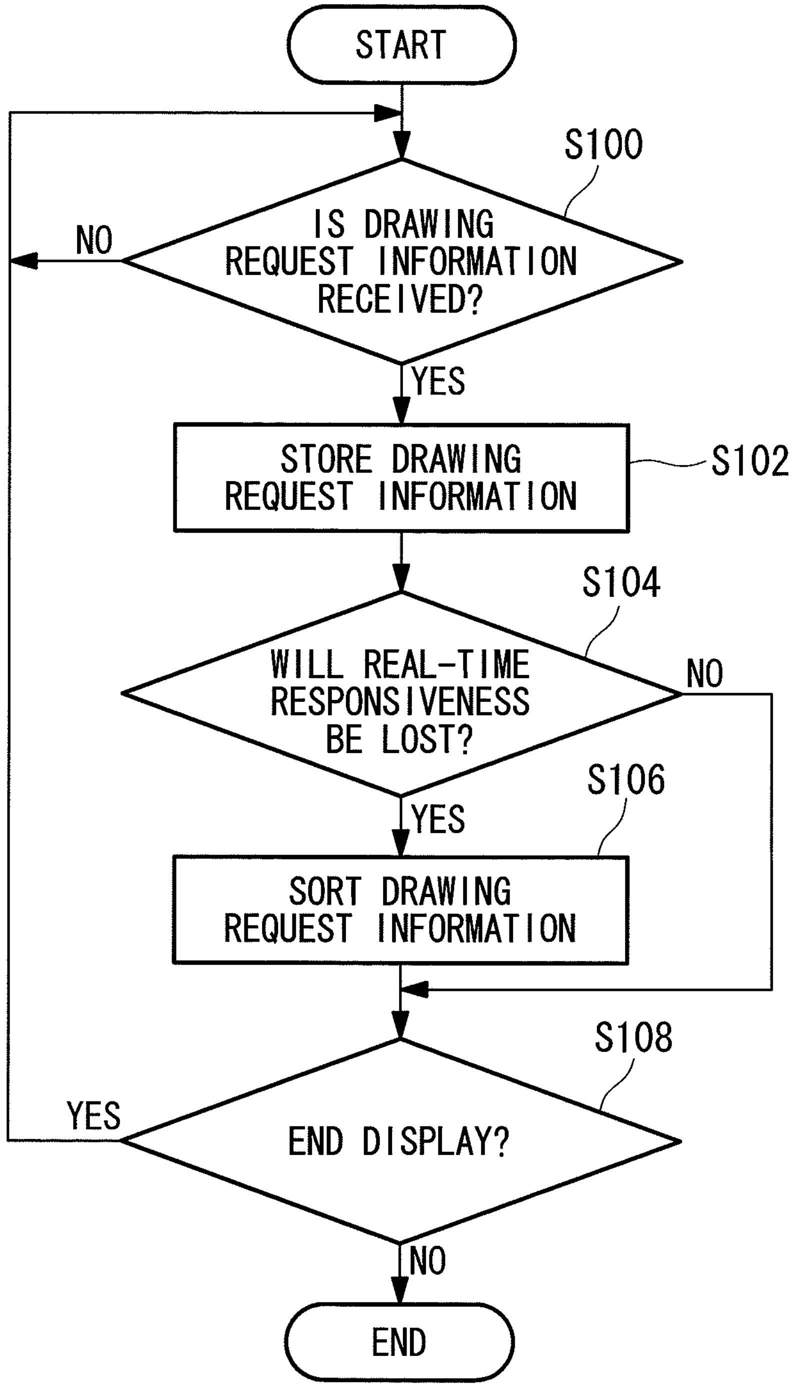
FIG. 4 is a flowchart showing the processing flow of a sorting program according to the first embodiment of the present invention.

FIG. 4 is a flow chart showing the processing flow of a sorting program executed by the CPU 40 when performing the sorting processing, and the sorting program is stored in a predetermined region of the HDD 46 in advance. This program is started when the operation of the shared display device 18 is started.

First, in Step 100, the external interfaces 32 are in a standby state until the drawing request information is received from one of the plurality of input operation devices 12, and the process advances to Step 102 when the drawing request information is received.

In Step 102 that follows, the received drawing request information is stored in the buffer 52.

In Step 104 that follows, it is judged whether or not real-time responsiveness in updating the display contents in the shared display device 18 will be lost or not, and the process advances to Step 106 in the case of an affirmative judgment, whereas the process advances to Step 108 in the case of a negative judgment.

A situation in which real-time responsiveness will be lost is a situation in which updating of the display contents based on any drawing request information among the multiple pieces of drawing request information stored in the buffer 52 is performed after a predetermined amount of time (for example, one second) or more has passed after the drawing request information has been sent to the display control device 16. In other words, a situation in which real-time responsiveness will be lost is a situation in which a large amount of drawing request information is sent to the display control device 16 per unit time, which makes the processing load on the CPU 40 a high load.

Because the processing time for displaying contents based on the drawing request information can be predicted in advance for each type of drawing request information, the CPU 40 can judge whether or not real-time responsiveness will be lost by accumulating the processing time of the drawing request information stored in the buffer 52.

In Step 106, the drawing request information stored in the buffer 52 is sorted.

Figure 5:
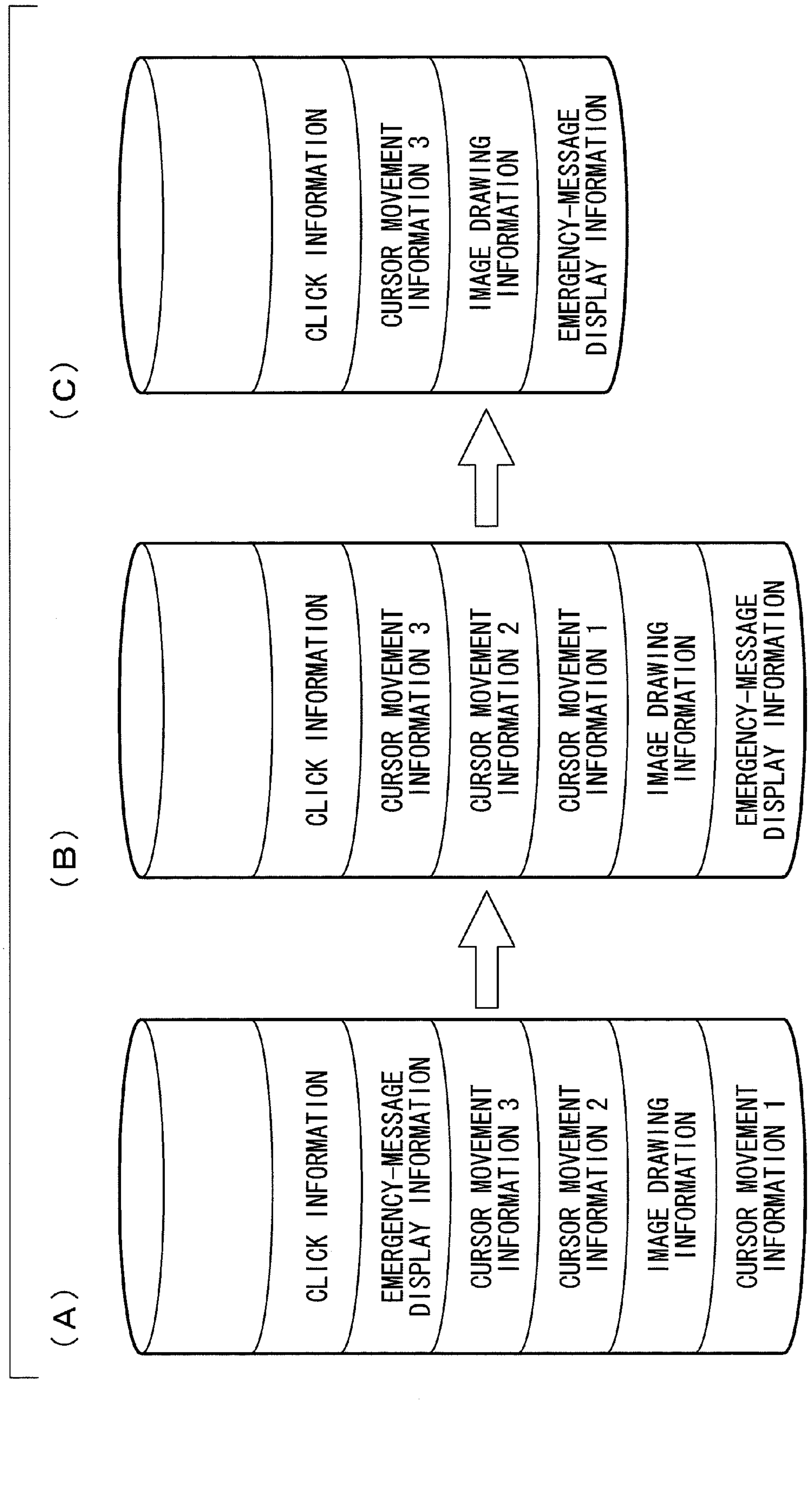
FIG. 5 is a schematic diagram required for explaining sorting processing according to the first embodiment of the present invention.

The processing executed in Step 106 will be described with reference to FIG. 5.

FIG. 5(A) shows a case in which a large amount of drawing request information is stored in the buffer 52, making the processing load on the CPU 40 a high load, and, as an example, cursor movement information 1, image drawing information, cursor movement information 2, cursor movement information 3, emergency-message display information, and click information are stored in the buffer 52. It is assumed that various types of drawing request information described above have been sent to the display control device 16 from the plurality of input operation devices 12 in this order. Specifically, when the sorting processing is not performed, the cursor movement information 1, the image drawing information, the cursor movement information 2, the cursor movement information 3, the emergency-message display information, and the click information are read out in this order, image signals are generated on the basis of the read-out drawing request information, and the display contents at the shared display device 18 are updated.

Then, as shown in FIG. 5(B), the multiple pieces of drawing request information stored in the buffer 52 are sorted in the order of the priority levels of each type of drawing request information. Specifically, the priority level information added to the drawing request information is read out and the individual pieces of drawing request information are sorted on the basis of the priority level information. Because the same types of drawing request information have the same priority level, the same types of drawing request information are sorted so as to be placed in order of the time at which the drawing request information is sent to the display control device 16.

In the example in FIG. 5(B), the emergency-message display information, the image drawing information, the cursor movement information 1, the cursor movement information 2, the cursor movement information 3, and the click information are sorted into this order.

Furthermore, in the sorting processing according to the first embodiment, a predetermined type of drawing request information stored in the buffer 52 is deleted from the buffer 52, excluding the most recent drawing request information.

In the first embodiment, the above-described predetermined type of the drawing request information is, as an example, assumed to be the cursor movement information. Accordingly, as shown in FIG. 5(C), the cursor movement information (the cursor movement information 1 and the cursor movement information 2), excluding the cursor movement information 3, which is the most recent cursor movement information, are deleted from the buffer 52.

As shown in Table 2, the possibility of deletion from the buffer 52 is predetermined for each piece of the drawing request information, and, in the first embodiment, deletion possibility information, which indicates the possibility of deletion, is added to the drawing request information together with the priority level information, and the CPU 40 deletes the drawing request information on the basis of the deletion possibility information.

TABLE 2

| TYPE OF DRAWING REQUEST INFORMATION | PRIORITY LEVEL | DELETION POSSIBILITY |
|---|---|---|
| EMERGENCY-MESSAGE DISPLAY INFORMATION | 1 | NOT POSSIBLE |
| IMAGE DRAWING INFORMATION | 2 | NOT POSSIBLE |
| CURSOR MOVEMENT INFORMATION | 3 | POSSIBLE |
| CLICK INFORMATION | 4 | NOT POSSIBLE |

Then, once the sorting of the drawing request information, performed in Step 106, is performed, the display control device 16 reads out the drawing request information stored in the buffer 52 in the sorted order, in other words, in order starting from higher priority levels, generates image signals based on the read-out drawing request information, and updates the display contents at the shared display device 18.

In Step 108 that follows, it is judged whether or not an instruction for ending the operation of the shared display device 18 has been input, and this program is ended in the case of an affirmative judgment, whereas the process returns to Step 100 in the case of a negative judgment. The instruction for ending the operation of the shared display device 18 is input through, for example, a predetermined input operation device 12 assigned to manage the control system 10 or an input device (not shown) provided in the display control device 16.

As has been described above, the display control device 16 according to the first embodiment is connected to the plurality of input operation devices 12 via the communication line 14 and updates the display contents at the shared display device 18 on the basis of the drawing request information sent thereto from the input operation devices 12. In addition, because the display control device 16 is provided with the buffer 52 that stores the multiple pieces of drawing request information sent from the input operation devices 12 and controls the shared display device 18 so that the display contents based on the multiple pieces of drawing request information stored in the buffer 52 are displayed by being updated in the order of the priority level, which is predetermined for each type of drawing request information, it is possible to maintain real-time responsiveness in updating the display contents on the shared display device 18 without impairing the operational performance for the users, even if a large amount of drawing request information is output from the plurality of input operation devices.

Because the buffer 52 according to the first embodiment is a FIFO buffer, by sorting the drawing request information in the order starting from higher priority levels, it is possible to maintain real-time responsiveness in updating the display contents on the shared display device, with a simple configuration and without impairing the operational performance for the users, even if a large amount of drawing request information is output from the plurality of input operation devices 12.

Second Embodiment

A second embodiment of the present invention will be described below.

The configuration of a control system 10 according to the second embodiment is the same as the configuration of the control system 10 according to the first embodiment shown in FIG. 1; the electrical configuration of input operation devices 12 according to the second embodiment is the same as the electrical configuration of the input operation devices 12 according to the first embodiment shown in FIG. 2; the electrical configuration of a display control device 16 according to the second embodiment is the same as the electrical configuration of the display control device 16 according to the first embodiment shown in FIG. 3; and therefore, descriptions thereof will be omitted.

The display control device 16 according to the second embodiment can be switched to either an absolute position mode that uses first cursor movement information, which specifies a cursor destination by means of an absolute position with reference to a predetermined position on the screen of the shared display device 18, or a relative position mode that uses second cursor movement information, which specifies a next cursor destination at the shared display device 18 on the basis of an amount of cursor movement per unit time in the input operation devices 12 with reference to previous cursor destination.

The processing load on the display control device 16 can be reduced in the absolute position mode, whereas the cursor displayed on the shared display device 18 can be moved more finely in the relative position mode.

To give a more specific description, as described in the first embodiment, the display at the shared display device 18 reflects cursor movements displayed on the local monitor devices 30 provided in the input operation devices 12.

Because of this, in the absolute position mode, if the resolution of the local monitor device 30 is lower than that of the shared display device 18, first cursor movement information in which absolute values of the cursor destination in the local monitor device 30 are corrected based on the resolution difference with respect to the shared display device 18 is sent to the display control device 16 from the input operation device 12, as described in the first embodiment. Accordingly, in the absolute position mode, because the display control device 16 does not need to compute the cursor destination, the processing load on the display control device 16 can be reduced; however, it is not possible to finely move the cursor in accordance with the resolution of the shared display device 18.

On the other hand, in the relative position mode, because the second cursor movement information indicates the amounts of change in the relative position between the previous cursor destination and the next cursor destination on the screen of the local monitor device 30, the display control device 16 needs to determine the amount of cursor movement on the shared display device 18 by computing the amount of cursor movement per unit time on the local monitor device 30 based on the second cursor movement information. Because of this, in the relative position mode, the processing load on the display control device 16 is increased. However, in the relative position mode, because the amount of cursor movement can also be made smaller at the shared display device 18 by making the amount of relative cursor movement per unit time on the screen of the local monitor device 30 smaller, the cursor can be moved at the resolution of the shared display device 18.

For example, in the case in which the resolution of the shared display device 18 is 4096 pixels by 768 pixels and the resolution of the local monitor device 30 is 1024 pixels by 768 pixels, in the absolute position mode, the CPU 20 generates the first cursor movement information to be sent to the display control device 16 by setting the cursor destination specified on the screen of the local monitor device 30 to be four times greater in the x-axis direction. Because of this, for the cursor on the screen of the shared display device 18, the cursor cannot be finely moved in the x-axis direction.

On the other hand, in the relative position mode, by making the amount of relative cursor movement per unit time on the screen of the local monitor device 30 smaller, the cursor on the screen of the shared display device 18 can be finely moved pixel-by-pixel in the x-axis direction.

A user may arbitrarily switch between the absolute position mode and the relative position mode. Because the user inevitably moves the cursor on the screen of the local monitor device 30 slowly when the user attempts to finely move the cursor on the screen of the shared display device 18, switching from the absolute position mode to the relative position mode may be performed automatically when the amount of cursor movement per unit time on the screen of the local monitor device 30 drops to or below a predetermined value. With regard to this judgment for this automatic switching, for example, the CPU 40 in the display control device 16 makes the judgment and sends switching information, which indicates switching from the absolute position mode to the relative position mode, to the input operation device 12, and, once the input operation device 12 receives the switching information, the input operation device 12 subsequently sends the second cursor movement information to the display control device 16.

As above, although the present invention has been described in terms of the individual embodiments described above, the technical scope of the present invention is not limited to the scope described in the individual embodiments described above. It is possible to add various alterations or improvements to the individual embodiments described above within a range that does not depart from the spirit of the invention, and the technical scope of the present invention also encompasses forms to which such alterations or improvements are added.

For example, although the individual embodiments described above have been described in terms of the case in which the input operation devices 12 send the drawing request information to the display control device 16 by adding the priority level information, which indicates the priority level, as well as the deletion possibility information, the present invention is not limited thereto, and a form in which the drawing request information is sent to the display control device 16 from the input operation devices 12 without adding the priority level information or the deletion possibility information may be employed. In such a form, the display control device 16 stores, in the HDD 46 in advance, priority level tables indicating the priority level and deletion possibility for each type of the drawing request information, as shown in Table 1 and Table 2 prepared in advance, and, in the sorting processing, the display control device 16 sorts the drawing request information stored in the buffer 52 in the order of priority level on the basis of the priority level tables.

Although the individual embodiments described above have been described in terms of the case in which, in the sorting processing, every time the display control device 16 receives the drawing request information, the display control device 16 judges whether or not real-time responsiveness will be lost in updating the display contents at the shared display device 18, the present invention is not limited thereto, and a form in which whether or not real-time responsiveness will be lost in updating the display contents in the shared display device 18 is judged at predetermined time intervals (for example, every one second) may be employed.

Although the individual embodiments described above have been described in terms of the case in which, in the sorting processing, the drawing request information stored in the buffer 52 is sorted in the order of the priority level when real-time responsiveness will be lost in updating the display contents in the shared display device 18, the present invention is not limited thereto, and it is permissible to employ a form in which, for example, the drawing request information stored in the buffer 52 is sorted in the order of the priority level every time the display control device 16 receives the drawing request information and stores it in the buffer 52, without judging whether or not real-time responsiveness will be lost in updating the display contents in the shared display device 18.

Although the individual embodiments described above have been described for the case in which a FIFO buffer is employed as the buffer 52, the present invention is not limited thereto, and an other type of buffer may be employed as the buffer 52 so long as it is a buffer that is capable of reading out the drawing request information in the order of priority level.

What is claimed is:

1. A display control device that is connected to a plurality of input operation devices via a communication line and that updates display contents on a shared display device on the basis of drawing request information sent from the input operation devices, the display control device comprising:

a storage unit that stores multiple pieces of the drawing request information sent from the input operation devices;

a control unit that controls the shared display device, wherein the control unit includes:

a judgment part that judges as to whether or not real-time responsiveness in updating the display contents in the shared display device is lost if the display contents are updated based on the multiple pieces of the drawing request information stored in the storage unit, and a sorting part that sorts the multiple pieces of the drawing request information stored in the storage unit in order of priority level which is predetermined for each type of the drawing request information when the judgment unit judges that the real-time responsiveness is lost, wherein the control unit reads out the multiple pieces of the drawing request information from the storage unit in the sorted order when the judgment unit judges that the real-time responsiveness is lost, and controls the shared display device so that the display contents are updated based on the multiple pieces of the drawing request information which are read out in the sorted order.

2. A display control device according to claim 1, wherein a predetermined type of the drawing request information stored in the storage unit indicates a possibility of deletion and can be deleted from the storage unit, excluding the most recent drawing request information, the possibility of deletion is added to the drawing request information together with the priority level.

3. A display control device according to claim 1, wherein the drawing request information includes cursor movement information that indicates a cursor destination displayed on the shared display device, wherein the cursor movement information specifies the cursor destination by an absolute position with reference to a predetermined position on a screen indicated by the shared display device.

4. A display control device according to claim 3, wherein the display control device is switched either to a first mode, in which first cursor movement information that specifies the cursor destination by absolute position with reference to a predetermined position on the screen of the shared display device, is used as the cursor movement information, or to a second mode, in which second cursor movement information that specifies a next cursor destination at the shared display device on the basis of an amount of cursor movement per unit time at the input operation devices with reference to a previous cursor destination, is used as the cursor movement information.

5. A control system comprising:

a plurality of input operation devices that send drawing request information for updating display contents at a shared display device;

a display control device according to claim 1.

6. A display control device according to claim 1, wherein the priority levels are set to be higher for drawing request information indicating display content of greater importance.

7. A display control device according to claim 1, wherein the drawing request information includes cursor movement information which indicates a cursor destination to be displayed on the shared display device, image drawing information for drawing images generated at the input operation devices on the shared display device, click information for executing an application, and emergency-message display information created at the input operation devices for causing an emergency massage to be displayed on the shared display device.

8. A display control method, in which a plurality of input operation devices are connected via a communication line and display contents in a shared display device are updated on the basis of drawing request information sent from the input operation devices, the display control method comprising:

a step of judging whether or not real-time responsiveness in updating the display contents in the shared display device is lost if the display contents are updated based on the multiple pieces of the drawing request information stored in a storage unit, a step of sorting the multiple pieces of the drawing request information stored in the storage unit in order of priority level which is predetermined for each type of the drawing request information when it is judged that the real-time responsiveness is lost, a step of reading out the multiple pieces of the drawing request information from the storage unit in the sorted order when it is judged that real-time responsiveness is lost, and a step of controlling the shared display device so as to display that the display contents are updated based on the multiple pieces of the drawing request information which are read out in the sorted order.

* * * * *